(12) United States Patent
Huang et al.

(10) Patent No.: US 12,027,525 B2
(45) Date of Patent: Jul. 2, 2024

(54) INTEGRATED CIRCUIT DEVICE, METHOD, AND SYSTEM

(71) Applicant: TAIWAN SEMICONDUCTOR MANUFACTURING CO., LTD., Hsinchu (TW)

(72) Inventors: Chien Yao Huang, Hsinchu (TW); Wun-Jie Lin, Hsinchu (TW); Kuo-Ji Chen, Wu-Ku (TW)

(73) Assignee: TAIWAN SEMICONDUCTOR MANUFACTURING COMPANY, LTD., Hsinchu (TW)

(*) Notice: Subject to any disclaimer, the term of this patent is extended or adjusted under 35 U.S.C. 154(b) by 614 days.

(21) Appl. No.: 16/940,930

(22) Filed: Jul. 28, 2020

(65) Prior Publication Data
US 2022/0037365 A1    Feb. 3, 2022

(51) Int. Cl.
| | |
|---|---|
| H01L 27/11 | (2006.01) |
| G06F 30/392 | (2020.01) |
| H01L 21/265 | (2006.01) |
| H01L 21/8238 | (2006.01) |
| H01L 27/02 | (2006.01) |
| H01L 27/118 | (2006.01) |
| G06F 117/02 | (2020.01) |

(52) U.S. Cl.
CPC ...... *H01L 27/11807* (2013.01); *G06F 30/392* (2020.01); *H01L 21/26513* (2013.01); *H01L 21/823807* (2013.01); *H01L 21/823892* (2013.01); *H01L 27/0207* (2013.01); *G06F 2117/02* (2020.01); *H01L 2027/1189* (2013.01)

(58) Field of Classification Search
CPC ....... H01L 27/11807; H01L 21/823892; H01L 27/0207; H01L 2027/1189
See application file for complete search history.

(56) References Cited

U.S. PATENT DOCUMENTS

| | | | | |
|---|---|---|---|---|
| 7,260,442 | B2 * | 8/2007 | Hwang | G03F 1/84 700/121 |
| 8,357,955 | B2 * | 1/2013 | Tanaka | H01L 27/0207 326/103 |
| 8,561,003 | B2 * | 10/2013 | Kawa | G06F 30/392 716/132 |
| 9,082,886 | B2 * | 7/2015 | Chen | H01L 29/107 |
| 9,256,709 | B2 * | 2/2016 | Yu | G06F 30/39 |
| RE45,988 | E * | 4/2016 | Tanaka | H01L 27/0207 |
| 9,406,815 | B2 * | 8/2016 | Chen | H01L 29/94 |
| 9,768,119 | B2 * | 9/2017 | Yu | H01L 21/768 |
| RE47,095 | E * | 10/2018 | Tanaka | H01L 27/11807 |

(Continued)

*Primary Examiner* — Mounir S Amer
*Assistant Examiner* — Alexander Belousov
(74) *Attorney, Agent, or Firm* — Hauptman Ham, LLP

(57) ABSTRACT

An integrated circuit (IC) device includes a plurality of TAP cells arranged at intervals in a first direction and a second direction transverse to the first direction. The plurality of TAP cells includes at least one first TAP cell. The first TAP cell includes two first end areas and a first middle area arranged consecutively in the second direction. The first middle area includes a first dopant of a first type implanted in a first well region of the first type. The first end areas are arranged on opposite sides of the first middle area in the second direction. Each of the first end areas includes a second dopant of a second type implanted in the first well region, the second type different from the first type.

20 Claims, 9 Drawing Sheets

(56) References Cited

U.S. PATENT DOCUMENTS

| | | | | |
|---|---|---|---|---|
| 10,157,910 B2* | 12/2018 | Xu | | H01L 27/0207 |
| 10,490,558 B2* | 11/2019 | Choi | | H01L 23/5286 |
| 10,605,859 B2* | 3/2020 | Salem | | H01L 23/544 |
| RE48,085 E* | 7/2020 | Tanaka | | H01L 27/0207 |
| 10,872,190 B2* | 12/2020 | Lai | | G06F 30/398 |
| 10,886,224 B2* | 1/2021 | Gerousis | | H01L 23/5286 |
| RE48,831 E* | 11/2021 | Tanaka | | H01L 27/0207 |
| 11,296,230 B2* | 4/2022 | Iwahori | | H01L 27/088 |
| 2002/0105049 A1* | 8/2002 | Barney | | H01L 27/118 |
| | | | | 326/103 |
| 2011/0049575 A1* | 3/2011 | Tanaka | | H01L 27/11807 |
| | | | | 257/E27.013 |
| 2012/0286341 A1* | 11/2012 | Chen | | H01L 27/0805 |
| | | | | 257/E29.345 |
| 2014/0040838 A1* | 2/2014 | Liu | | G03F 1/36 |
| | | | | 716/53 |
| 2014/0264924 A1* | 9/2014 | Yu | | H01L 27/0207 |
| | | | | 438/622 |
| 2015/0278429 A1* | 10/2015 | Chang | | G03F 1/36 |
| | | | | 716/52 |
| 2015/0318407 A1* | 11/2015 | Chen | | H01L 23/528 |
| | | | | 257/296 |
| 2016/0336343 A1* | 11/2016 | Kuo | | H01L 27/11807 |
| 2017/0133321 A9* | 5/2017 | Yu | | H01L 27/0207 |
| 2017/0194319 A1* | 7/2017 | Xu | | H01L 23/5286 |
| 2018/0074117 A1* | 3/2018 | Salem | | H01L 23/50 |
| 2018/0151559 A1* | 5/2018 | Sio | | H01L 27/092 |
| 2018/0350819 A1* | 12/2018 | Choi | | H01L 23/53257 |
| 2020/0019666 A1* | 1/2020 | Lai | | H01L 27/0207 |
| 2020/0350439 A1* | 11/2020 | Iwahori | | H01L 29/78642 |
| 2020/0373241 A1* | 11/2020 | Gerousis | | H01L 23/5226 |
| 2021/0249400 A1* | 8/2021 | Yadoguchi | | H03K 19/0948 |
| 2022/0037365 A1* | 2/2022 | Huang | | G06F 30/392 |

* cited by examiner

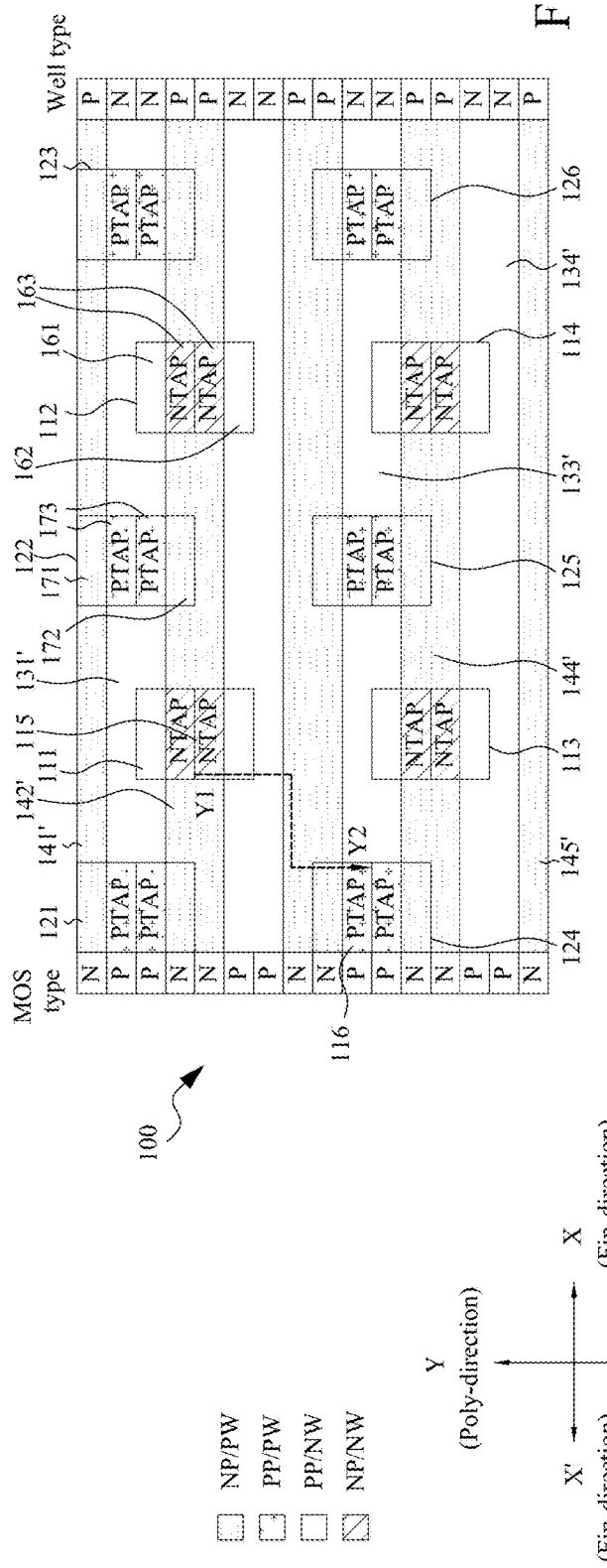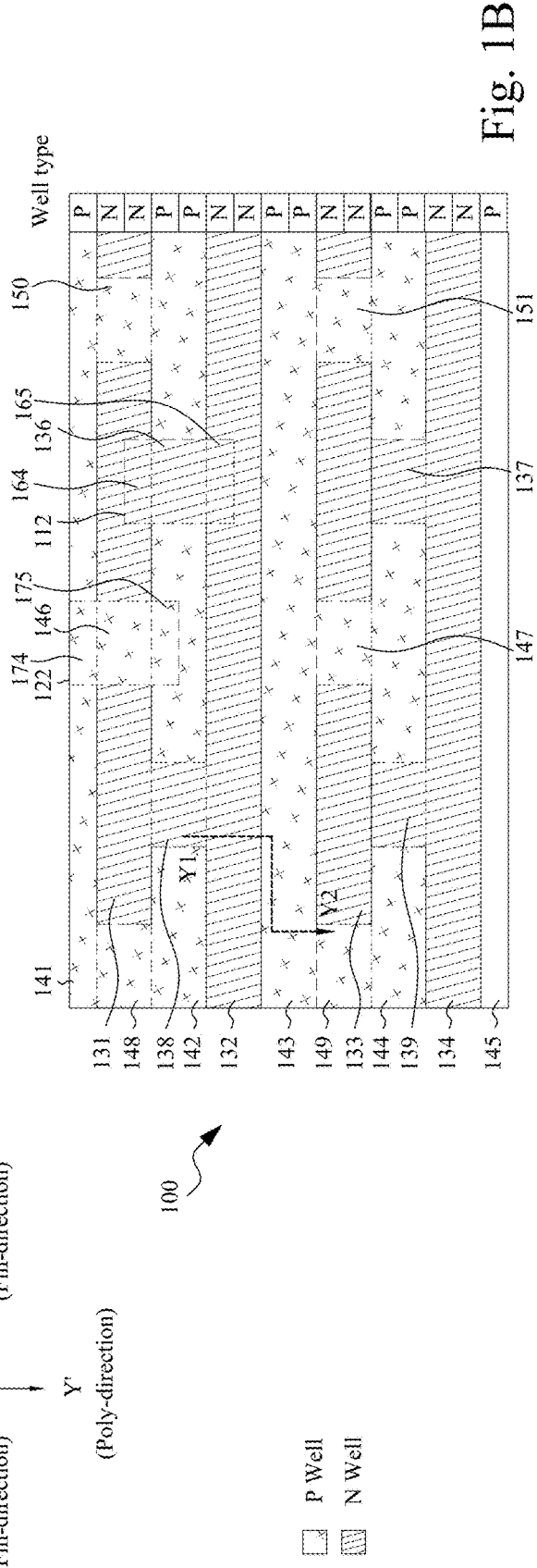

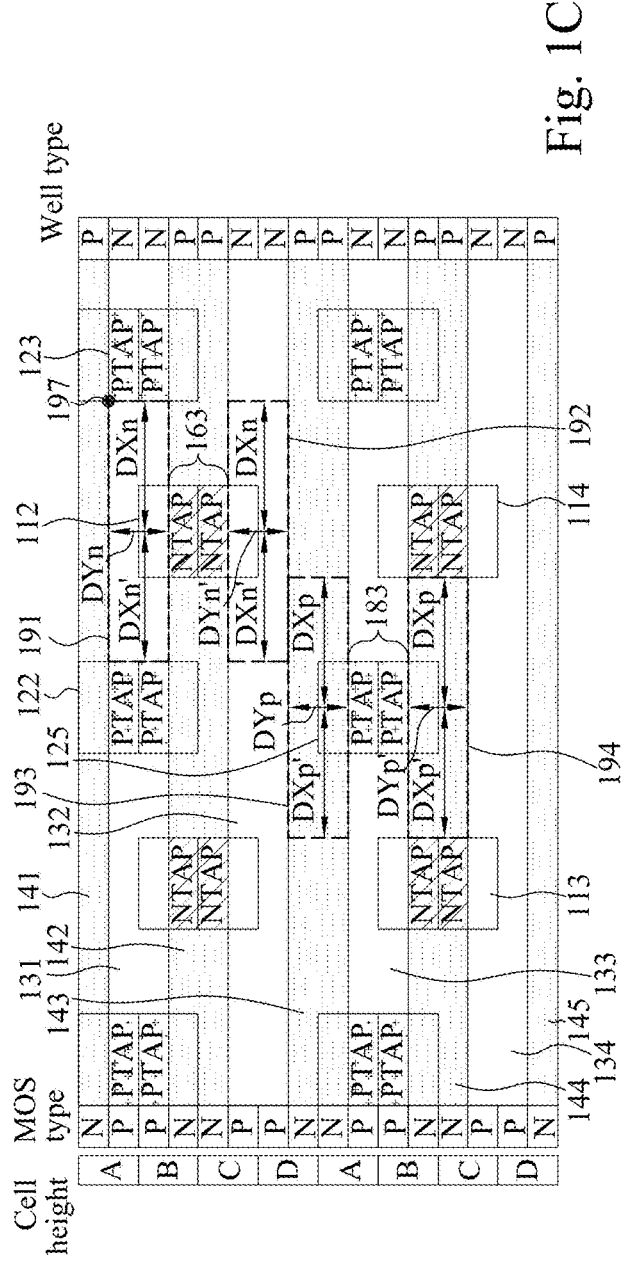
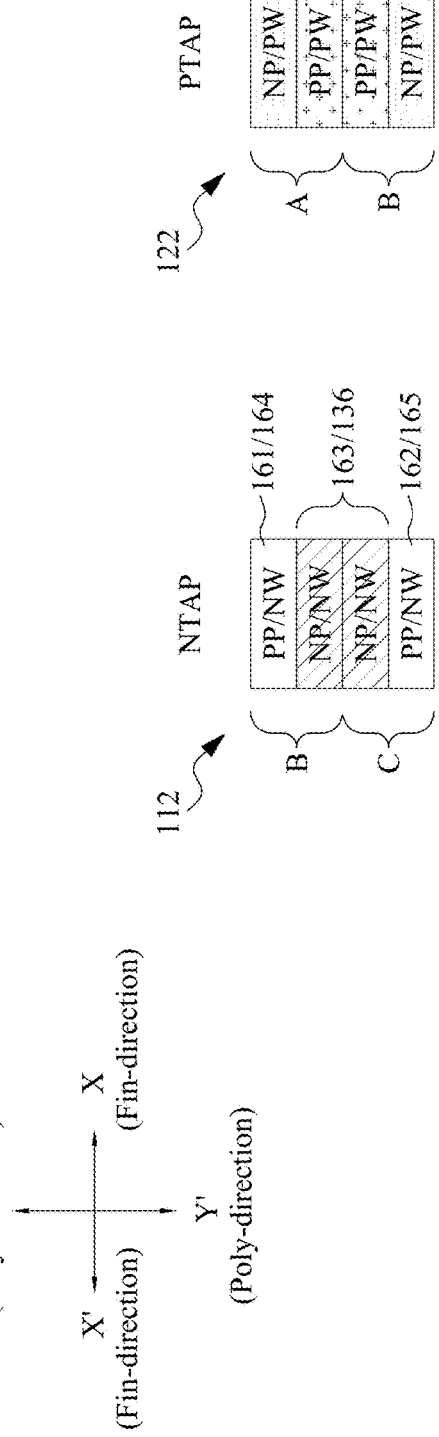
Fig. 1C
Fig. 1D
Fig. 1E

INTEGRATED CIRCUIT DEVICE, METHOD, AND SYSTEM

BACKGROUND

An integrated circuit (IC) typically includes a number of semiconductor devices represented in an IC layout diagram. An IC layout diagram is hierarchical and includes modules which carry out higher-level functions in accordance with the semiconductor device's design specifications. The modules are often built from a combination of cells, each of which represents one or more semiconductor structures configured to perform a specific function. Cells having pre-designed layout diagrams, sometimes known as standard cells, are stored in standard cell libraries (hereinafter "libraries" or "cell libraries" for simplicity) and accessible by various tools, such as electronic design automation (EDA) tools, to generate, optimize and verify designs for ICs.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 1A is a schematic view of an IC layout diagram, in accordance with some embodiments.

FIG. 1B is a schematic view of well regions in an IC layout diagram, in accordance with some embodiments.

FIG. 1C is a schematic view similar to FIG. 1A, and showing further features of an IC layout diagram, in accordance with some embodiments.

FIGS. 1D and 1E are schematic views of TAP cells of different types, in accordance with some embodiments.

DETAILED DESCRIPTION

Figure 2:
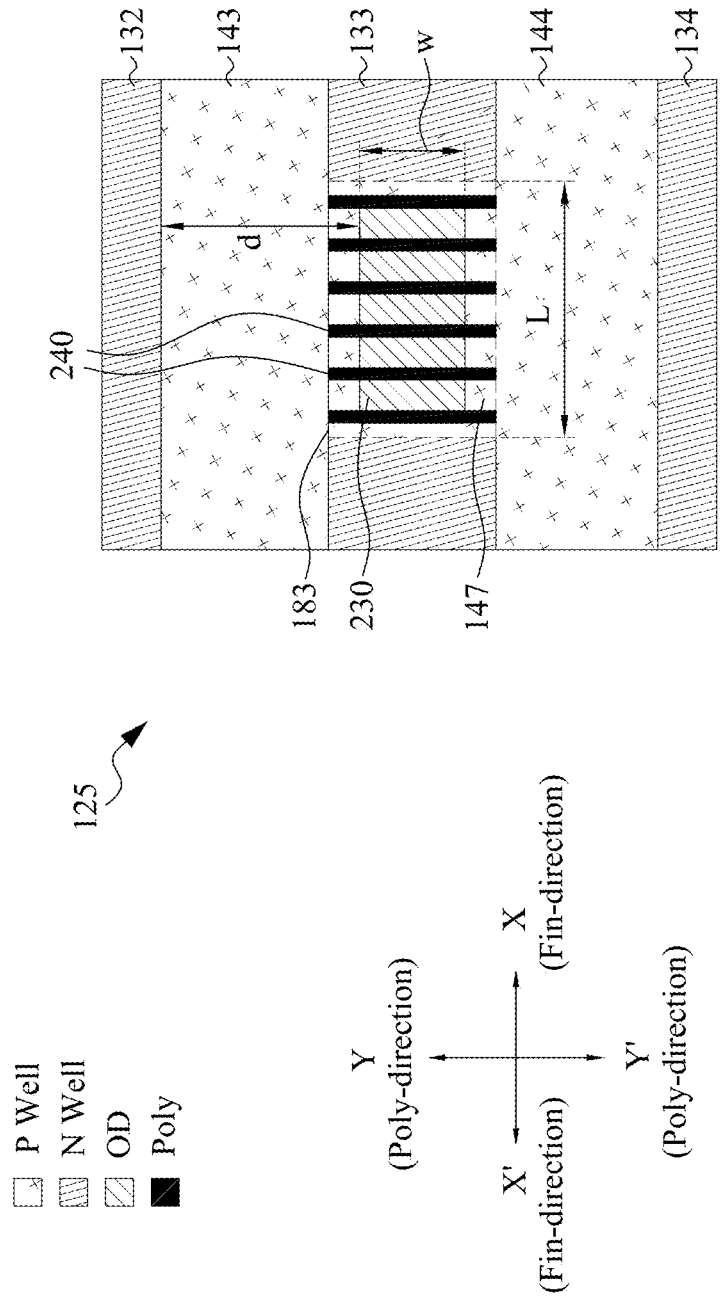
FIG. 2 is a schematic, enlarged view of a portion of an IC layout diagram, in accordance with some embodiments.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A well tap cell, referred to herein as "TAP cell," is a standard cell which defines a region in a doped well where the doped well is coupled to a bias voltage, such as a power supply voltage. TAP cells are included in an IC layout diagram to improve latch-up immunity of ICs manufactured in accordance with the IC layout diagram.

With the current tendency of scaling down semiconductor devices, placement of TAP cells in an IC layout diagram for manufacturing ICs raises one or more considerations including, but not limited to, process bottleneck due to reduced lithography critical dimension (CD), and mixed channel effects. To address one or more of such considerations, in an IC layout diagram in accordance with some embodiments, TAP cells of different types are arranged in an interleaving manner in two transverse directions, and/or each TAP cell is configured to have a double cell height. As a result, in at least one embodiment, it is possible to achieve one or more effects, including, but not limited to, relaxing process constraints, increasing latch-up immunity at reduced well tap areas, reducing well tap resistance, and improving tap current collection efficiency.

FIG. 1A is a schematic view of an IC layout diagram 100 of an IC device, in accordance with some embodiments.

The IC layout diagram 100 comprises a plurality of TAP cells arranged at intervals in a first direction, e.g., X'-X direction, and a second direction, e.g., Y'-Y direction, transverse to the X'-X direction. The plurality of TAP cells comprises at least one first TAP cell. For example, the plurality of TAP cell comprises a plurality of first TAP cells 111-114 of a first type. The plurality of TAP cells further comprises at least one second TAP cell. For example, the plurality of TAP cell comprises a plurality of second TAP cells 121-126 of a second type different from the first type. The first TAP cells 111-114 are arranged in a plurality of first rows extending in the X'-X direction and a plurality of first columns extending in the Y'-Y direction. Similarly, the second TAP cells 121-126 are arranged in a plurality of second rows extending in the X'-X direction and a plurality of second columns extending in the Y'-Y direction. In the example configuration in FIG. 1A, there are two first rows and two first columns of the first TAP cells 111-114, and there are two second rows and three second columns of the second TAP cells 121-126. The first columns of the first TAP cells 111-114 and the second columns of the second TAP cells 121-126 are alternatingly arranged in the X'-X direction. For example, a first column including the first TAP cells 111, 113 is arranged, in the X'-X direction, between two second columns of second TAP cells, namely, a second column including the second TAP cells 121, 124 and another second column including the second TAP cells 122, 125. Similarly, the second column including the second TAP cells 122, 125 is arranged, in the X'-X direction, between two first columns of first TAP cells, namely, the first column including the first TAP cells 111, 113 and another first column including the first TAP cells 112, 114. The first TAP cells in a first row partially overlap, in the X'-X direction, the second TAP cells in a corresponding second row. For example, the first TAP cells 111, 112 in a first row partially overlap, in the X'-X direction, the second TAP cells 121, 122, 123 in a corresponding second row. The configuration described above with respect to FIG. 1A is an example, and other configurations are within the scopes of various embodiments. For example, some embodiments include different numbers of first or second TAP cells in each first or second row, or in each of first or second column.

The IC layout diagram 100 further comprises a plurality of well regions. FIG. 1B is a schematic view of the well regions in the IC layout diagram 100, in accordance with some embodiments.

The well regions of the IC layout diagram 100 include first well regions 131-134 of the first type, and second well regions 141-145 of the second type. The first well regions 131-134 and the second well regions 141-145 extend in the X'-X direction, and are arranged alternatingly in the Y'-Y direction. The well regions of FIG. 1B are doped with corresponding dopants and become corresponding doped well regions which are indicated in FIG. 1A by the same reference numerals but with the prime symbol. For example, the well region 131 in FIG. 1B corresponds to a doped well region 131' in FIG. 1A. For sake of simplicity, doped well regions 131'-134' and 141'-145' are referred to hereinafter as well regions 131-134 and 141-145, respectively.

The IC layout diagram 100 further comprises a plurality of first connection well regions of the first type, and a plurality of second connection well regions of the second type. In the example configuration in FIG. 1B, example first connection well regions are indicated as 136-139 and example second connection well regions are indicated as 146-151. Each first connection well region extends, in the Y'-Y direction, between a pair of adjacent first well regions and across a second well region. For example, the first connection well region 136 or 138 extends, in the Y'-Y direction, between the adjacent first well regions 131, 132, and across the second well region 142. In at least one embodiment, each first connection well region, e.g., 136 or 138, is continuous to the corresponding adjacent first well regions, e.g., 131, 132. Each second connection well region extends, in the Y'-Y direction, between a pair of adjacent second well regions and across a first well region. For example, the second connection well region 146, 148 or 150 extends, in the Y'-Y direction, between the adjacent second well regions 141, 142, and across the first well region 131. In at least one embodiment, each second connection well region, e.g., 146, 148 or 150, is continuous to the corresponding adjacent second well regions, e.g., 141, 142.

Referring to both FIGS. 1A and 1B, each of the TAP cells of the IC layout diagram 100 is placed corresponding to a first or second connection well region. For example, FIG. 1B shows the boundaries of the first TAP cell 112 and a second TAP cell 122 placed corresponding to the first connection well region 136 and the second connection well region 146, respectively. As shown in FIG. 1A, the first TAP cell 112 comprises two first end areas 161, 162 and a first middle area 163 all arranged consecutively in the Y'-Y direction. The first middle area 163 is placed in the first connection well region 136 (FIG. 1B) corresponding to the first TAP cell 112. The first end areas 161, 162 are arranged on opposite sides of the first middle area 163 in the Y'-Y direction, and are placed respectively in areas 164, 165 (FIG. 1B) of the first well regions 131, 132 connected by the first connection well region 136. As a result and as shown in FIG. 1A, the first TAP cell 112 extends, in the Y'-Y direction, from one first well region 131 to the adjacent first well region 132 across the second well region 142. Other first TAP cells are similarly placed and/or configured. As shown in FIG. 1A, the second TAP cell 122 comprises two second end areas 171, 172 and a second middle area 173 all arranged consecutively in the Y'-Y direction. The second middle area 173 is placed in the second connection well region 146 (FIG. 1B) corresponding to the second TAP cell 122. The second end areas 171, 172 are arranged on opposite sides of the second middle area 173 in the Y'-Y direction, and are placed respectively in areas 174, 175 (FIG. 1B) of the second well regions 141, 142 connected by the second connection well region 146. As a result and as shown in FIG. 1A, the second TAP cell 122 extends, in the Y'-Y direction, from one second well region 141 to the adjacent second well region 142 across the first well region 131. Other second TAP cells are similarly placed and/or configured.

As noted herein, first TAP cells in a first row and second TAP cells in a corresponding second row overlap. For example, as shown in FIG. 1A, one of the first end areas, i.e., the first end area 161, of the first TAP cell 112 overlaps, in the X'-X direction, the second middle area 173 of the second TAP cell 122. The other first end area 162 of the first TAP cell 112 does not overlap the second middle area 173, or any other part, of the second TAP cell 122 in the X'-X direction. One of the second end areas, i.e., the second end area 172, of the second TAP cell 122 overlaps, in the X'-X direction, the first middle area 163 of the first TAP cell 112. The other second end area 171 of the second TAP cell 122 does not overlap the first middle area 163, or any other part, of the first TAP cell 112 in the X'-X direction.

In the example configuration in FIGS. 1A-1E, the first type is N-type and the second type is P-type. In other words, the first well regions 131-134 and the first connection well regions 136-139 are N-type well regions (hereinafter "N wells"), the second well regions 141-145 and the second connection well regions 146-151 are P-type well regions (hereinafter "P wells"), the first TAP cells 111-114 are N-type TAP cells (hereinafter "NTAP cells"), and the second TAP cells 121-126 are P-type TAP cells (hereinafter "PTAP cells"). An N well is a region that includes N-type dopants, whereas a P well is a region that includes P-type dopants. In the drawings, N wells are labelled as "NW," or "N well," or by the well type "N," P wells are labelled as "PW," or "P well," or by the well type "P," N-type dopants are labelled as "NP," and P-type dopants are labelled as "PP."

An NTAP is a region in an N well, but with a higher concentration of N-type dopants than the N well itself. For example, the first middle area 163 of the first TAP cell 112 comprises an NTAP (hereinafter referred to as "NTAP 163") with a higher concentration of N-type dopants than the first connection well region 136 which is an N well and in which the NTAP 163 is formed. As described herein, besides the NTAP 163, the first TAP cell 112 further comprises the first end areas 161, 162 which are configured to collect leakage currents (or body currents) from the first well regions 131 and 132, respectively, to the NTAP 163. Other NTAP cells are similarly placed and/or configured. A PTAP cell is a region in a P well, but with a higher concentration of P-type dopants than the P well itself. For example, the second middle area 173 of the second TAP cell 122 comprises a PTAP (hereinafter referred to as "PTAP 173") with a higher concentration of P-type dopants than the second connection well region 146 which is a P well and in which the PTAP 173 is formed. As described herein, besides the PTAP 173, the second TAP cell 122 further comprises the second end areas 171, 172 which are configured to collect body currents from the second well regions 141 and 142, respectively, to the PTAP 173. Other PTAP cells are similarly placed and/or configured.

In an N well, P-type active regions with P-type dopants are arranged to form one or more circuit elements. In a P well, N-type active regions with N-type dopants are arranged to form one or more circuit elements. Examples of circuit elements include, but are not limited to, transistors and diodes. Examples of transistors include, but are not limited to, metal oxide semiconductor field effect transistors (MOSFET), complementary metal oxide semiconductor (CMOS) transistors, bipolar junction transistors (BJT), high voltage transistors, high frequency transistors, P-channel and/or N-channel field effect transistors (PFETs/NFETs), etc.), FinFETs, planar MOS transistors with raised source/drains, or the like. For example, in the N wells 131-134, P-type active regions are arranged to define P-channel metal-oxide semiconductor (PMOS) regions for forming PMOS transistors. In the P wells 141-145, N-type active regions are arranged to define N-channel metal-oxide semiconductor (NMOS) regions for forming NMOS transistors. In the drawings, NMOS regions for forming NMOS transistors are indicated by the MOS type "N," and PMOS regions for forming PMOS transistors are indicated by the MOS type "P."

A cell having a pre-designed layout diagram is read from a cell library and placed in the IC layout diagram 100 such that NMOS transistors or devices of the cell are arranged in an NMOS region, whereas PMOS transistors or devices of the cell are arranged in a PMOS region. NTAP, PTAP, N-type active regions and P-type active regions are sometimes commonly referred to as oxide-definition (OD) regions, and are schematically illustrated in FIG. 2 with the label "OD."

The IC layout diagram 100 further comprises gate regions (not shown in FIG. 1A, but described herein with respect to FIG. 2) which include a conductive material, such as, polysilicon, and are schematically illustrated in FIG. 2 with the label "Poly." Other conductive materials for the gate regions, such as metals, are within the scopes of various embodiments. The gate regions extend, or are elongated, in the Y'-Y direction across the OD regions. The Y'-Y direction is also referred to herein as the Poly direction. In some embodiments, each OD region has one or more fin features arranged therein. Such fin features extend, or are elongated, in the X'-X direction, and spaced from each other in the Y'-Y direction. The X'-X direction is also referred to herein as the Fin direction. An example of a fin feature is described with respect to FIG. 6. A schematic cross-sectional view of an IC device corresponding to a portion of the IC layout diagram 100 in accordance with some embodiments is described with respect to FIG. 4. This portion of the IC layout diagram 100 is indicated in FIGS. 1A and 1B by arrow Y1→Y2 which extends between middle areas 115 and 116 of TAP cells 111 and 124, respectively.

FIG. 1C is a schematic view similar to FIG. 1A, and showing further features of the IC layout diagram 100, in accordance with some embodiments. In at least one embodiment, a device cell is a cell other than a TAP cell. A cell height of a cell is the dimension of the cell in the Poly direction. A cell height of a device cell is referred to as a device cell height. As described herein, a device cell from a cell library is placed in the IC layout diagram 100 such that NMOS transistors or devices of the device cell are arranged in an NMOS region, whereas PMOS transistors or devices of the device cell are arranged in a PMOS region. For example, device cells having a device cell height A in the Y'-Y direction include NMOS transistors or devices arranged in the P well 141, and PMOS transistors or devices arranged in a half of the N well 131. Device cells having a device cell height B in the Y'-Y direction include PMOS transistors or devices arranged in the other half of the N well 131, and NMOS transistors or devices arranged in a half of the P well 142. Device cells having a device cell height C in the Y'-Y direction include NMOS transistors or devices arranged in the other half of the P well 142, and PMOS transistors or devices arranged in a half of the N well 132. Device cells having a device cell height D in the Y'-Y direction include PMOS transistors or devices arranged in the other half of the N well 132, and NMOS transistors or devices arranged in a half of the P well 143. In at least one embodiment, at least one of the device cell heights A-D is different from at least another one of the device cell heights A-D. In at least one embodiment, all the device cell heights A-D are the same. The device cell heights A-D depend on one or more factors, including, but not limited to, manufacturing process constraints, circuitry design, or the like. In at least one embodiment, each of the device cell heights A-D is from 0.025 μm to 0.300 μm which is advantageous in some particular advanced manufacturing process nodes.

In the Y'-Y direction, each of the TAP cells has a double cell height, i.e., a cell height being twice a device cell height. For example, the NTAP cell 112, 114 has a cell height of (B+C), the PTAP cell 122, 125 has a cell height of (A+B). In at least one embodiment, the cell height of a TAP cell is from 0.05 μm to 0.600 μm.

For each NTAP, DXn is a maximum device-to-TAP distance in the X direction, DXn' is a maximum device-to-TAP distance in the X' direction, DYn is a maximum device-to-TAP distance in the Y direction, and DYn' is a maximum device-to-TAP distance in the Y' direction. For example, for the NTAP 163, DXn is the distance in the X direction from a midpoint or center of the NTAP 163 to an adjacent PTAP in the PTAP cell 123, DXn' is the distance in the X' direction from the midpoint or center of the NTAP 163 to an adjacent PTAP in the PTAP cell 122, DYn is the distance in the Y direction from the NTAP 163 to the adjacent P well 141, and DYn' is the distance in the Y' direction from the NTAP 163 to the adjacent P well 143. In at least one embodiment, DXn is different from DXn' and/or DYn is different from DYn'. In at least one embodiment, DXn is the same as DXn' and/or DYn is the same as DYn'. When DXn is the same as DXn' and/or DYn is the same as DYn', uniform latch-up immunity is achievable in the X'-X direction and/or the Y'-Y direction, respectively.

For each PTAP, DXp is a maximum device-to-TAP distance in the X direction, DXp' is a maximum device-to-TAP distance in the X' direction, DYp is a maximum device-to-TAP distance in the Y direction, and DYp' is a maximum device-to-TAP distance in the Y' direction. For example, for a PTAP 183 in the PTAP cell 125, DXp is the distance in the X direction from a midpoint or center of the PTAP 183 to an adjacent NTAP in the NTAP cell 114, DXp' is the distance in the X' direction from the midpoint or center of the PTAP 183 to an adjacent NTAP in the NTAP cell 113, DYp is the distance in the Y direction from the PTAP 183 to the adjacent N well 132, and DYp' is the distance in the Y' direction from the PTAP 183 to the adjacent N well 134. In at least one embodiment, DXp is different from DXp' and/or DYp is different from DYp'. In at least one embodiment, DXp is the same as DXp' and/or DYp is the same as DYp'. When DXp is the same as DXp' and/or DYp is the same as DYp', uniform latch-up immunity is achievable in the X'-X direction and/or the Y'-Y direction, respectively.

In some embodiments, at least one of DXn, DXn', DXp, DXp' is from 1 µm to 300 µm. In some situations where one or more of DXn, DXn', DXp, DXp' is/are lower than 1 µm, the chip area occupied by TAP cells is excessively large, and significantly reduces the remaining chip area for cells with other functions. In some situations where one or more of DXn, DXn', DXp, DXp' is/are greater than 300 µm, there is an elevated risk of latch-up.

In some embodiments, a TAP-to-TAP distance in the X'-X direction between adjacent PTAPs or NTAPs is (DXn+DXn') or (DXp+DXp'), respectively, and is from 2 µm to 600 µm. In some embodiments, DYn=(A+B)/2, DYn'=(C+D)/2, DYp=(A+D)/2, and DYp'=(B+C)/2. In some embodiments, at least one of DYn, DYn', DYp, DYp' is from 0.025 µm to 0.300 µm. In some situations where one or more of DYn, DYn', DYp, DYp' is/are lower than 0.025 µm, the chip area occupied by TAP cells is excessively large, and significantly reduces the remaining chip area for cells with other functions. In some situations where one or more of DYn, DYn', DYp, DYp' is/are greater than 0.300 µm, there is an elevated risk of latch-up.

In some embodiments, each NTAP is configured to collect body currents from areas defined as (DXn*DYn+DXn'*DYn+DXn*DYn'+DXn' *DYn'). These areas are PMOS regions indicated as 191, 192 in FIG. 1C, corresponding to four rows of body currents. The collected body currents are defined as JNbody*(DXn*DYn+DXn' *DYn+DXn*DYn'+DXn' *DYn'), where JNbody is a device body current density per P well layout area. In some embodiments, each PTAP is configured to collect body currents from areas defined as (DXp*DYp+DXp' *DYp+DXp*DYp'+DXp'*DYp'). These areas are NMOS regions indicated as 193, 194 in FIG. 1C, corresponding to four rows of body currents. The collected body currents are defined as JPbody*(DXp*DYp+DXp' *DYp+DXp*DYp'+DXp' *DYp'), where JPbody is a device body current density per N well layout area.

In a simplified configuration where all DXn, DXn', DXp, DXp' are equal to DX, all DYn, DYn', DYp, DYp' are equal to DY, and both JNbody and JPbody are equal to Jbody, a LUP immunity index of an IC device corresponding to the IC layout diagram 100 is determined by the following relationship $$V = V(DX,DY) + 4 * J_{body}(DX*DY) * R(DH)$$

where

V is the LUP immunity index represented by a voltage drop caused by the body current Jbody in the IC device, V(DX,DY) is the voltage potential at a point (DX,DY), e.g., point 197 in FIG. 1C, which is at distances DX and DY in the X direction and Y direction, respectively, from a TAP, e.g., NTAP 163, and R(DH) is a TAP resistance for a TAP cell with a double cell height, e.g., any of TAP cells 111-114 and 121-126.

The lower the voltage drop V, the better LUP immunity of the IC device.

Other approaches use TAP cells with a single cell height, i.e., a cell height being equal to a device cell height (e.g., any single A, or B, or C or D in FIG. 1C). In such other approaches, a TAP resistance R(SH) of a TAP cell with single cell height is greater than four times the TAP resistance R(DH) for a TAP cell with a double cell height in accordance with some embodiments. In other words, R(SH)>4*R(DH). In at least one embodiment, R(SH) is at least ten times greater than R(DH). An explanation of TAP resistance reduction in accordance with some embodiments is provided with respect to FIG. 2. Due to the significant reduction of the TAP resistance in TAP cells with a double cell height, the LUP immunity index V of an IC device in accordance with some embodiments is reduced compared to the other approaches. In other words, the LUP immunity of the IC device in accordance with some embodiments is improved.

Further, as described herein, a TAP cell in accordance with some embodiments is configured to collect body currents from an area corresponding to four rows of body currents, as exemplified by the PMOS regions 191, 192 for the NTAP cell 112 in FIG. 1C. As a result, in at least one embodiment, it is possible to collect body currents from a wider area than in other approaches, which, in turns, reduces the well tap areas required for intended LUP immunity while increasing areas for other cells and/or devices for other functionality.

FIG. 1D is a schematic view of the first TAP cell 112, which is an NTAP cell, in accordance with some embodiments. As described herein, the NTAP cell 112 comprises two first end areas 161, 162 and the first middle area 163 arranged consecutively in the Y'-Y direction. The first middle area 163 comprises a dopant of a first type, e.g., N-type. The first end areas 161, 162 are arranged on opposite sides of the first middle area 163 in the Y'-Y direction, and comprise a dopant of a second type, e.g., P-type. The N-type and P-type dopants of the areas 161-163 of the NTAP cell 112 are all implanted in a continuous N well which comprises the first connection well region 136 and the areas 164, 165 of the first well regions 131, 132, respectively. The first middle area 163 is configured as an NTAP to couple the first connection well region 136 to a first power supply voltage, e.g., VDD, as described with respect to FIG. 3. The first end areas 161, 162 have the areas 164, 165 of the first well regions 131, 132, respectively, coupled to the first connection well region 136, and are configured to collect body currents from the first well regions 131 and 132, respectively, to the NTAP in the first middle area 163. In the Y'-Y direction, the height of the NTAP cell 112 is (B+C), i.e., twice the device cell height. The height of the first middle area 163 with the NTAP is a half of the height of the NTAP cell 112, i.e., (B+C)/2.

FIG. 1E is a schematic view of the second TAP cell 122, which is an PTAP cell, in accordance with some embodiments. As described herein, the PTAP cell 122 comprises two second end areas 171, 172 and the second middle area 173 arranged consecutively in the Y'-Y direction. The second middle area 173 comprises a dopant of the second type, e.g., P-type. The second end areas 171, 172 are arranged on opposite sides of the second middle area 173 in the Y'-Y direction, and comprise a dopant of the first type, e.g., N-type. The N-type and P-type dopants of the areas 171-173 of the PTAP cell 122 are all implanted in a continuous P well which comprises the second connection well region 146 and the areas 174, 175 of the second well regions 141, 142, respectively. The second middle area 173 is configured as a PTAP to couple the second connection well region 146 to a second power supply voltage, e.g., VSS, as described with respect to FIG. 3. The second end areas 171, 172 have the areas 174, 175 of the second well regions 141, 142, respectively, coupled to the second connection well region 146, and are configured to collect body currents from the second well regions 141 and 142, respectively, to the PTAP in the second middle area 173. In the Y'-Y direction, the height of the PTAP cell 122 is (A+B), i.e., twice the device cell height. The height of the second middle area 173 with the PTAP is a half of the height of the PTAP cell 122, i.e., (A+B)/2.

FIG. 2 is a schematic, enlarged view of a portion of an IC layout diagram, in accordance with some embodiments. Specifically, FIG. 2 is a schematic, enlarged view of the PTAP cell 125 of the IC layout diagram 100. The PTAP cell 125 comprises a PTAP 183 which includes an active region 230 and gate regions 240 formed over the second connection well region 147. The second connection well region 147 is a P well that extends continuously into the P wells 143, 144. The PTAP 183 is formed in a same row in the X'-X direction as the N well 133. Active regions and gate regions also exist in one or more of the N wells 132, 133, 134 and P wells 143, 144, but are not illustrated in FIG. 2 for simplicity.

The PTAP cell 125 has a double cell height, and therefore, the active region 230 in the PTAP 183 also has a greater width or height W in the Y'-Y direction than in other approaches with TAP cells having a single cell height. The greater height W increases the number of fins in the active region 230 which increases the contact area with the gate regions 240, reduces the TAP resistance and improves LUP immunity, as described with respect to FIG. 1C. In at least one embodiment, as the number of fins per TAP increases, the TAP resistance per fin decreases which provides improved TAP fin number linearity without current crowding effects.

The double cell height of the PTAP cell 125 also extends a well enclosure of the PTAP 183, compared to other approaches with TAP cells having a single cell height. The well enclosure of the PTAP 183 is indicated in FIG. 2 as a distance d from the active region 230 to the closest N well 132 in the Y direction (or to the closest N well 134 in the Y' direction), and is greater than a corresponding well enclosure in other approaches. In at least one embodiment, the extended well enclosure contributes to further reduction of TAP resistance by suppressing contour dopant effects.

In the example configuration in FIG. 2, a length L in the X'-X direction of the active region 230 of the PTAP 183 is greater than the height W in the Y'-Y direction. This elongated shape of the PTAP 183 in the X'-X direction increases the amount of body currents collected by the PTAP 183 in the Y'-Y direction. Compared to other approaches where body current collection is non-uniform and occurs primarily in the X'-X direction, the body current collection by well taps in at least one embodiment is configurable to be uniform in both X'-X direction and Y'-Y direction by increasing body current collection in the Y direction. As a result, body current collection efficiency is improved in one or more embodiments.

As described herein, some other approaches for TAP cell placement suffer from some potential problems. For example, in a first approach, TAP cells are placed in a half-cell height arrangement across boundaries between P wells and N wells. Such a half-cell height arrangement faces manufacturing difficulties, especially at CD below 100 nm. In contrast, the TAP cells in some embodiments are enclosed within respective well regions and with extended well enclosure, therefore avoiding manufacturing difficulties associated with the half-cell height arrangement. For another example, in the described first approach and in a different, second approach, there are concerns with respect to mixed channel effects due to implant discontinuity between closely arranged NTAPs and PTAPs. Such concerns of mixed channel effects are obviated by one or more embodiments in which adjacent NTAPs and PTAPs are arranged with spacings from each other, as described with respect to FIGS. 1A-1C. In some embodiments, it is possible to achieve one or more effects, including, but not limited to, relaxing process constraints especially at advanced manufacturing process nodes, improving latch-up immunity, reducing areas occupied by TAP cells, and increasing areas where standard cells other than TAP cells are placeable. In an example, the areas occupied by TAP cells is reduced, in at least one embodiment, to about 45% of that observed in other approaches, while improving LUP immunity by about 50%.

Figure 3:
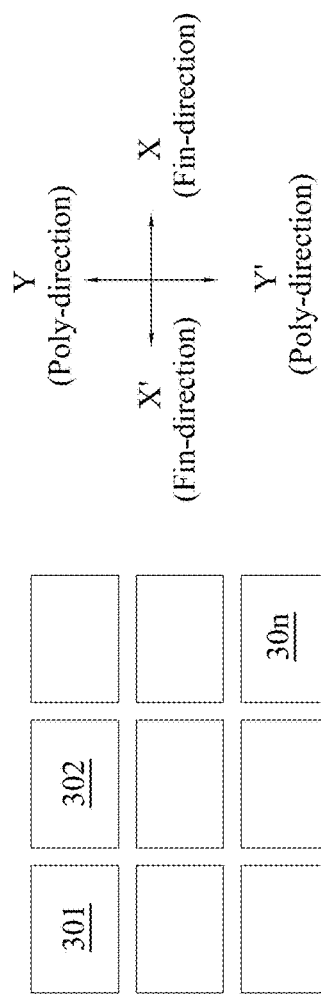
FIG. 3 is a schematic view of an IC layout diagram, in accordance with some embodiments.

FIG. 3 is a schematic view of an IC layout diagram 300, in accordance with some embodiments. The IC layout diagram 300 comprises a plurality of portions 301, 301, ... 30n which are arranged at regular intervals in the X'-X direction and Y'-Y direction. TAP cells are placed in each of the portions 301, 301, ... 30n in similar manner. For example, in each of the portions 301, 301, ... 30n, TAP cells are placed as described with respect to one or more of FIGS. 1A-1E and 2, in at least one embodiment. Other TAP cell placements are within the scopes of various embodiments. As a result, TAP cells are placed at regular intervals and in a repeating pattern over the IC layout diagram 300, to ensure intended LUP immunity over the IC layout diagram 300. In some embodiments, one or more advantages or effects described with respect to one or more of FIGS. 1A-1E and 2 are achievable in the IC layout diagram 300.

Figure 4:
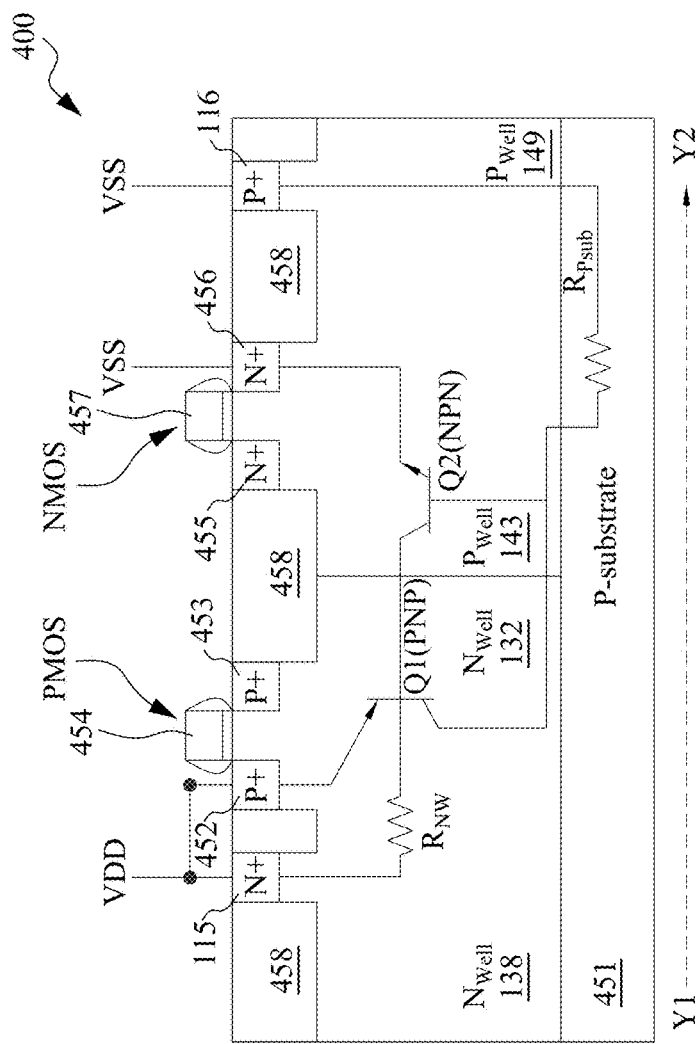
FIG. 4 is a schematic cross-sectional view combined with a schematic electric diagram of an IC device, in accordance with some embodiments.

FIG. 4 is a schematic cross-sectional view of an IC device 400, in accordance with some embodiments. The cross-sectional view in FIG. 4 is also combined with a schematic electric diagram of the IC device 400. In some embodiments, the IC device 400 corresponds to a portion of the IC layout diagram 100 indicated by arrow Y1→Y2 in FIGS. 1A and 1B. The IC device 400 comprises a substrate 451 on which TAP cells, well regions, active regions, gate regions, fin features are formed. For example, the IC device 400 comprises, on the substrate 451, an N well including a well region 132 connected with a connection well region 138 as best seen in FIG. 1B. The IC device 400 further comprises, on the substrate 451, a P well including a well region 143 connected with a connection well region 149 as best seen in FIG. 1B. P-type active regions 452, 453 are formed over the well region 132 of the N well. A gate region 454 is formed over the P-type active regions 452, 453, and defines together with the P-type active regions 452, 453 a PMOS corresponding to a transistor in the doped well regions 132' in FIG. 1A. An NTAP 115 corresponding to the middle area of the TAP cell 111 in FIG. 1A is formed over the connection well region 138 of the N well. N-type active regions 455, 456 are formed over the well region 143 of the P well. A gate region 457 is formed over the N-type active regions 455, 456, and defines together with the N-type active regions 455, 456 an NMOS corresponding to a transistor in the doped well regions 143' in FIG. 1A. A PTAP 116 corresponding to the middle area of the TAP cell 124 in FIG. 1A is formed over the connection well region 149 of the P well. The IC device 400 further comprises a plurality of isolation regions 458 between adjacent P well and N well. The P-type active region 452 of the PMOS is coupled to the first power supply voltage VDD. The N-type active region 456 of the NMOS is coupled to the second power supply voltage VSS, which is, in at least one embodiment, the ground. The substrate 451 is a P-type substrate. In at least one embodiment, the IC device 400 is formed on an N-type substrate instead of the P-type substrate 451.

The schematic electric diagram of the IC device 400 in FIG. 4 shows parasitic transistors Q1 and Q2. The parasitic transistor Q1 is a PNP transistor formed by the P-type active region 452, the N well region 132, and the P-type substrate 451. The parasitic transistor Q2 is an NPN transistor formed by the N well region 132, the P well region 143, and the N-type active region 456. In the absence of the NTAP 115 and/or the PTAP 116, there is a concern that a body current in one or more of the P-type substrate 451, P wells and N wells of the IC device 400 is sufficient to cause both of the parasitic transistors Q1 and Q2 to turn ON, and create a current path from VDD, through the turned ON parasitic transistors Q1 and Q2, to VSS. Such a current path between VDD and VSS is a latch-up situation that adversely affects performance of the IC device 400.

The provision of the NTAP 115 which is coupled to VDD and the PTAP 116 which is coupled to VSS reduces the likelihood of latch-up situations and improves LUP immunity of the IC device 400. In the schematic electric diagram of the IC device 400 in FIG. 4, a resistor $R_{NW}$ represents a TAP cell resistance between NTAPs of the IC device 400, representative by the NTAP 115, and the base of the parasitic transistor Q1, whereas a resistor $R_{Psub}$ represents a TAP cell resistance between PTAPs of the IC device 400, representative by the PTAP 116, and the base of the parasitic transistor Q2. The lower the resistances of the resistors $R_{NW}$ and $R_{Psub}$, the lower the likelihood of the parasitic transistors Q1 and Q2 being turned ON, respectively, the better the LUP immunity of the IC device 400. The resistance of the resistor $R_{NW}$ depends on a configuration and/or arrangement of NTAPs of the IC device 400. The resistance of the resistor $R_{Psub}$ depends on a configuration and/or arrangement of PTAPs of the IC device 400. By configuring and/or arranging the NTAPs and/or PTAPs as described herein, it is possible in at least one embodiment to improve LUP immunity of the IC device 400 at reduced TAP areas, with one or more other effects described herein.

Figure 5A:
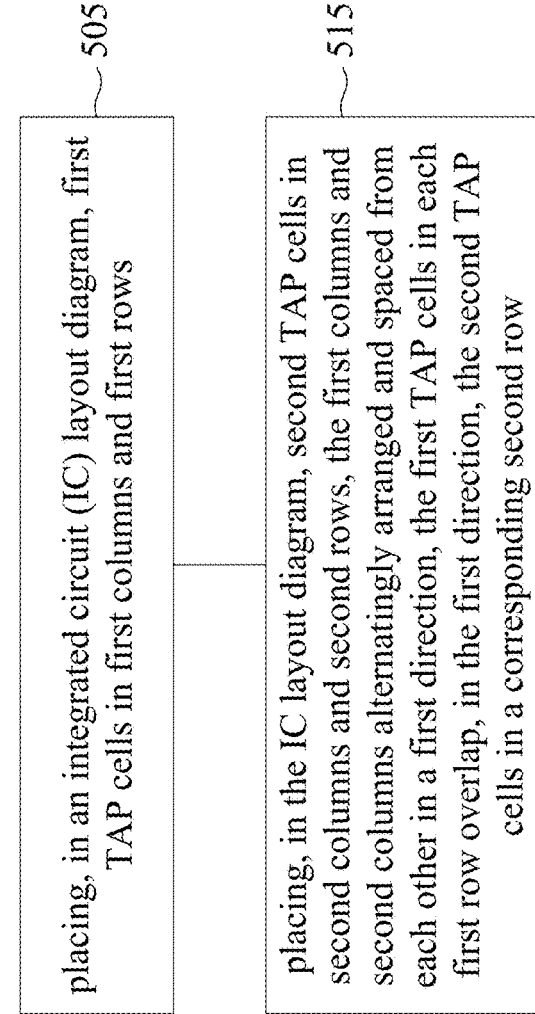
FIG. 5A is a flow chart of a method of generating an IC layout diagram, in accordance with some embodiments.

FIG. 5A is a flow chart of a method 500A for TAP cell placement in an IC layout diagram, in accordance with some embodiments. In at least one embodiment, the method 500A is performed in whole or in part by a processor as described herein, to generate an IC layout diagram corresponding to the IC layout diagram 100.

At operation 505, a plurality of first TAP cells of a first type is placed, in an IC layout diagram, in a plurality of plurality of first columns and a plurality of first rows. For example, as described with respect to FIGS. 1A-1C, a plurality of first TAP cells 111-114 is placed in the IC layout diagram 100 in two columns and two rows. The first TAP cells 111-114 are of a first type, e.g., N-type.

At operation 515, a plurality of second TAP cells of a second type is placed, in the IC layout diagram, in a plurality of second columns and a plurality of second rows. For example, as described with respect to FIGS. 1A-1C, a plurality of second TAP cells 121-126 is placed in the IC layout diagram 100 in three columns and two rows. The second TAP cells 121-126 are of a second type, e.g., P-type, different from the first type. The first rows of the first TAP cells 111-114 and the second rows of the second TAP cells 121-126 extend in a first direction, e.g., the X'-X direction. The first columns of the first TAP cells 111-114 and the second columns of the second TAP cells 121-126 are alternatingly arranged and spaced from each other in the X'-X direction, and extend in a second direction, e.g., the Y'-Y direction, transverse to the X'-X direction. The first TAP cells, e.g., 111, 112, in each first row partially overlap, in the X'-X direction, the second TAP cells, e.g., 121, 122, 123, in a corresponding second row.

In at least one embodiment, operations 505 and 515 occur concurrently, e.g., in a place and route operation of an IC manufacturing flow. In one or more embodiments, the first TAP cells and/or the second TAP cells are standard cells stored in and read from one or more cell libraries. In some embodiments, operations 505 and 515 are performed to place TAP cells at regular intervals and in a repeating pattern over the IC layout diagram, as described with respect to FIG. 3.

Figure 5B:
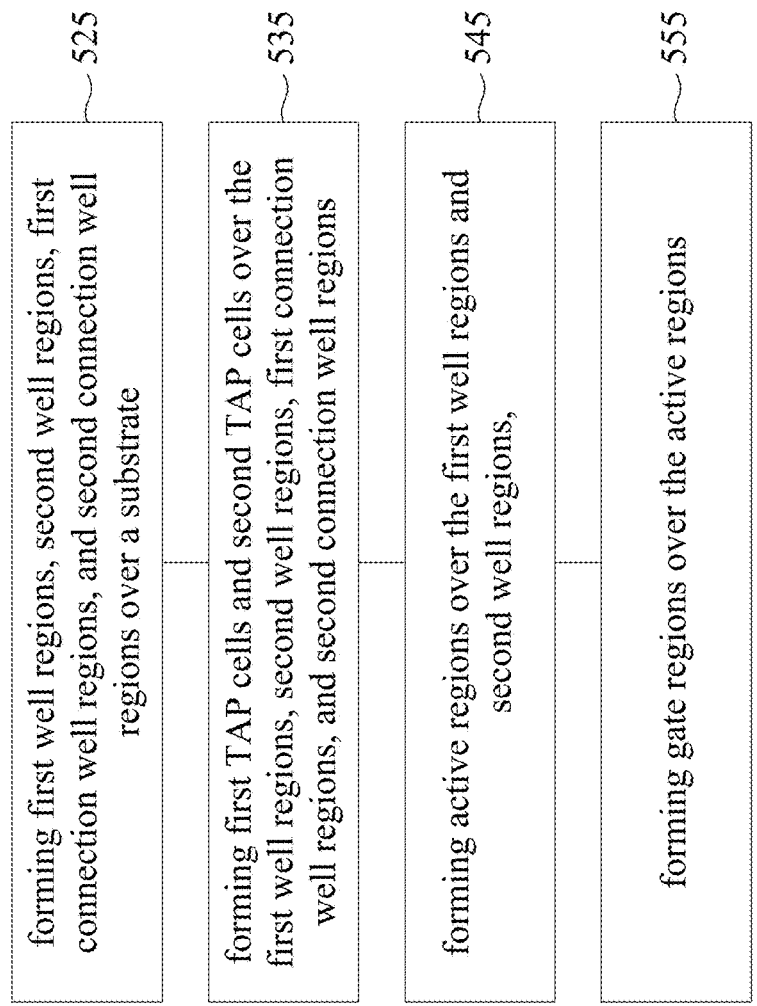
FIG. 5B is a flow chart of a method of manufacturing an IC device, in accordance with some embodiments.

FIG. 5B is a flow chart of a method 500B of manufacturing an IC device, in accordance with some embodiments. In at least one embodiment, an IC device is manufactured in accordance with the manufacturing method 500B based on the IC layout diagram 100 generated by the method 500A.

At operation 525, first well regions, second well regions, first connection well regions, and second connection well regions are formed over a substrate. For example, first well regions 131-134, second well regions 141-145, first connection well regions 136-139, and second connection well regions 146-151, as described with respect to FIG. 1B, are formed over a substrate 451 described with respect to FIG. 4. In at least one embodiment, the first well regions 131-134 and the first connection well regions 136-139, which are N wells, are formed simultaneously. In at least one embodiment, the second well regions 141-145 and second connection well regions 146-151, which are P wells, are formed simultaneously.

In some embodiments, the substrate is a semiconductor material (e.g., silicon, doped silicon, GaAs, or another semiconductor material). In some embodiments, the substrate is a P-doped substrate. In some embodiments, the substrate is an N-doped substrate. In some embodiments, the substrate is a rigid crystalline material other than a semiconductor material (e.g., diamond, sapphire, aluminum oxide ($Al_2O_3$), or the like) on which an IC is manufactured. In some embodiments, N-type and P-type dopants are added to the substrate to form N wells and P wells, respectively. In some embodiments, dopants are added to the substrate by, e.g., an ion implant tool. In some embodiments, isolation structures, such as isolation regions 458 described with respect to FIG. 4, are formed between adjacent P wells and N wells by etching trenches in the substrate with a dry or plasma etch process, and then filling the trenches with a dielectric material, e.g., silicon oxide, or spin on glass.

At operation 535, first TAP cells and second TAP cells are formed over the first well regions, second well regions, first connection well regions, and second connection well regions. For example, first TAP cells 111-114, which are NTAP cells, are formed over the first well regions 131-134 and the first connection well regions 136-139, which are N wells, as described with respect to FIG. 1A. Second TAP cells 121-126, which are PTAP cells, are formed over the second well regions 141-145 and second connection well regions 146-151, which are P wells, as described with respect to FIG. 1A. As a result, the first TAP cells 111-114 and the second TAP cells 121-126 are arranged in alternating columns along the Y'-Y direction, and overlap each other in the X'-X direction, as described with respect to FIG. 1A.

At operation 545, active regions are formed over the first well regions and second well regions. In at least one embodiment, P-type active regions are formed over N wells in portions not occupied by TAP cells. For example, P-type active regions 452, 453 are formed over an N well 132 in portions not occupied by an NTAP 115, as described with respect to FIG. 4. In at least one embodiment, N-type active regions are formed over P wells in portions not occupied by TAP cells. For example, N-type active regions 455, 456 are formed over a P well 143 in portions not occupied by a PTAP 116, as described with respect to FIG. 4.

In some embodiments, the TAP cells and the active regions are formed together, e.g., by ion implantation. For example, as shown in FIG. 1A, a middle area 163 of a first TAP cell 112 includes N-type dopants, and is formed together with N-type active regions, which also include N-type dopants, in a same ion implantation process. On the other hand, end areas 161, 162 of the first TAP cell 112 includes P-type dopants, and is formed together with P-type active regions, which also include P-type dopants, in a same ion implantation process. For a further example, a middle area 173 of a second TAP cell 122 includes P-type dopants, and is formed together with P-type active regions, which also include P-type dopants. On the other hand, end areas 171, 172 of the second TAP cell 122 includes N-type dopants, and is formed together with N-type active regions, which also include N-type dopants.

At operation 555, gate regions are formed over the active regions. For example, a gate region 454 is formed over the P-type active regions 452, 453, to define a PMOS, and a gate region 457 is formed over the N-type active regions 455, 456, to define an NMOS, as described with respect to FIG. 4. In some embodiments, a gate oxide is deposited over an active region, and then a conductive gate electrode is deposited over the gate oxide to form a gate region. Example materials of the gate oxide include $HfO_2$, $ZrO_2$, or the like. Example materials of the gate electrode include polysilicon, metal, or the like.

In some embodiments, the method 500B further comprises forming contacts to the TAP cells, active regions and gate regions. For example, an interlayer dielectric (ILD) layer is deposited over the substrate after forming the gate regions. The ILD layer is then etched in portions corresponding to the TAP cells, active regions and gate regions, the etched portions are filled with a conductive material, such as metal, to form conductive vias. A further metal layer is deposited over the vias and patterned to define interconnects to the TAP cells, active regions and gate regions. In at least one embodiment, the described process is repeated multiple times to form various metal layers connected by multiple via layers to define various connections within the IC being manufactured and/or external connections with other equipment outside the IC device.

The described methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

Figure 6:
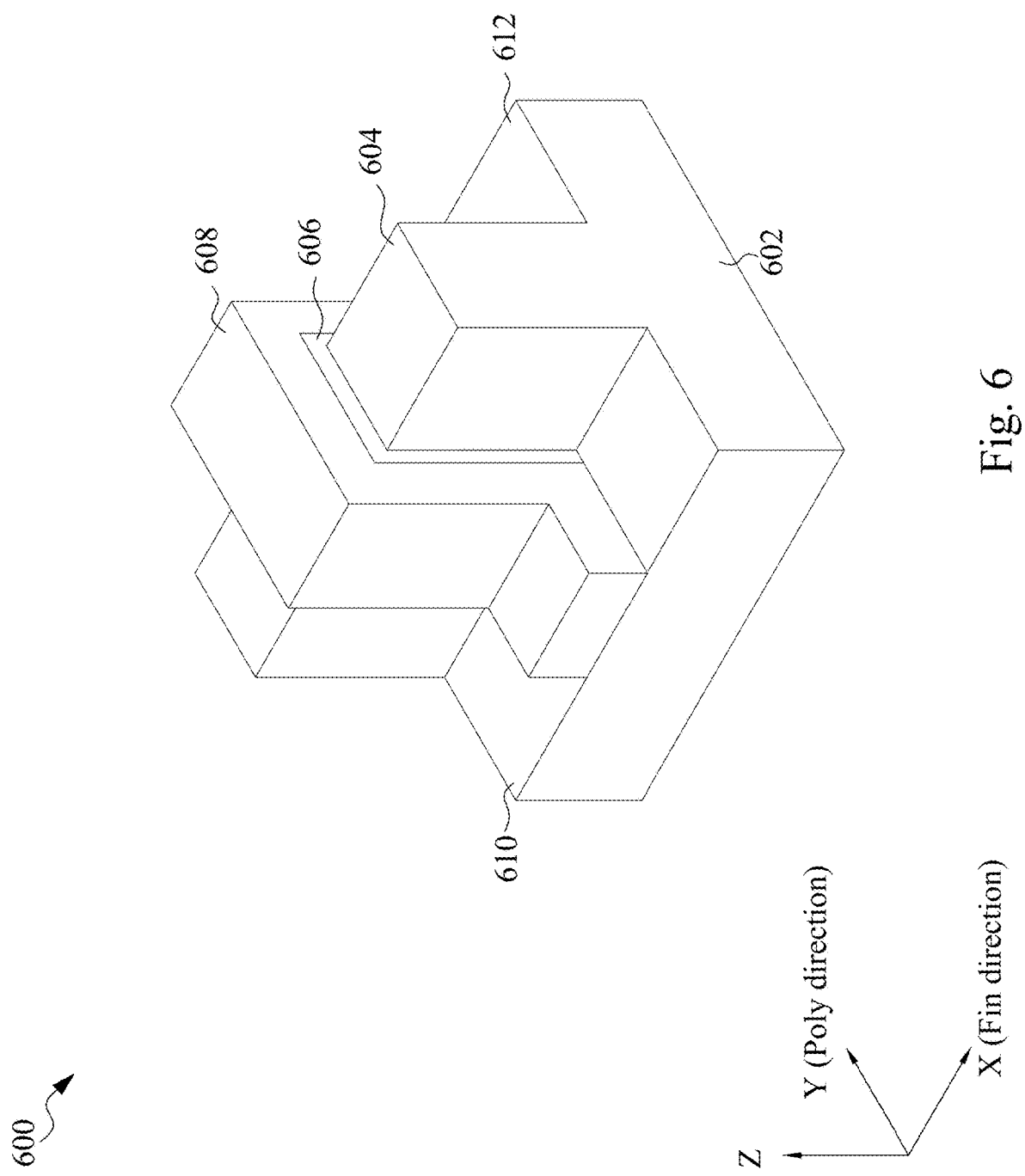
FIG. 6 is a perspective view of an example transistor having a fin feature, in accordance with some embodiments.

FIG. 6 is a perspective view of an example circuit element 600 having a fin feature, in accordance with some embodiments. In the example configuration in FIG. 6, circuit element 600 is a fin field-effect transistor (FINFET). FINFET 600 comprises a substrate 602, at least one fin feature (or fin) 604 extending in a Z direction from substrate 602, a gate dielectric 606 along surfaces of fin 604, and a gate electrode 608 over gate dielectric 606. A source region 610 and a drain region 612 are disposed over substrate 602 on opposite sides of fin 604. Fin 604, source region 610 and drain region 612 belong to an active region (or OD region) which corresponds, in one or more embodiments, to any active region described with respect to FIGS. 1A-4. In at least one embodiment, gate electrode 608 corresponds to any gate region described with respect to FIGS. 1A-4. The described configuration of a fin feature in an active region is an example. Other configurations are within the scopes of various embodiments.

In some embodiments, some or all of the methods discussed above are performed by an IC layout diagram generation system. In some embodiments, an IC layout diagram generation system is usable as part of a design house of an IC manufacturing system discussed below.

Figure 7:
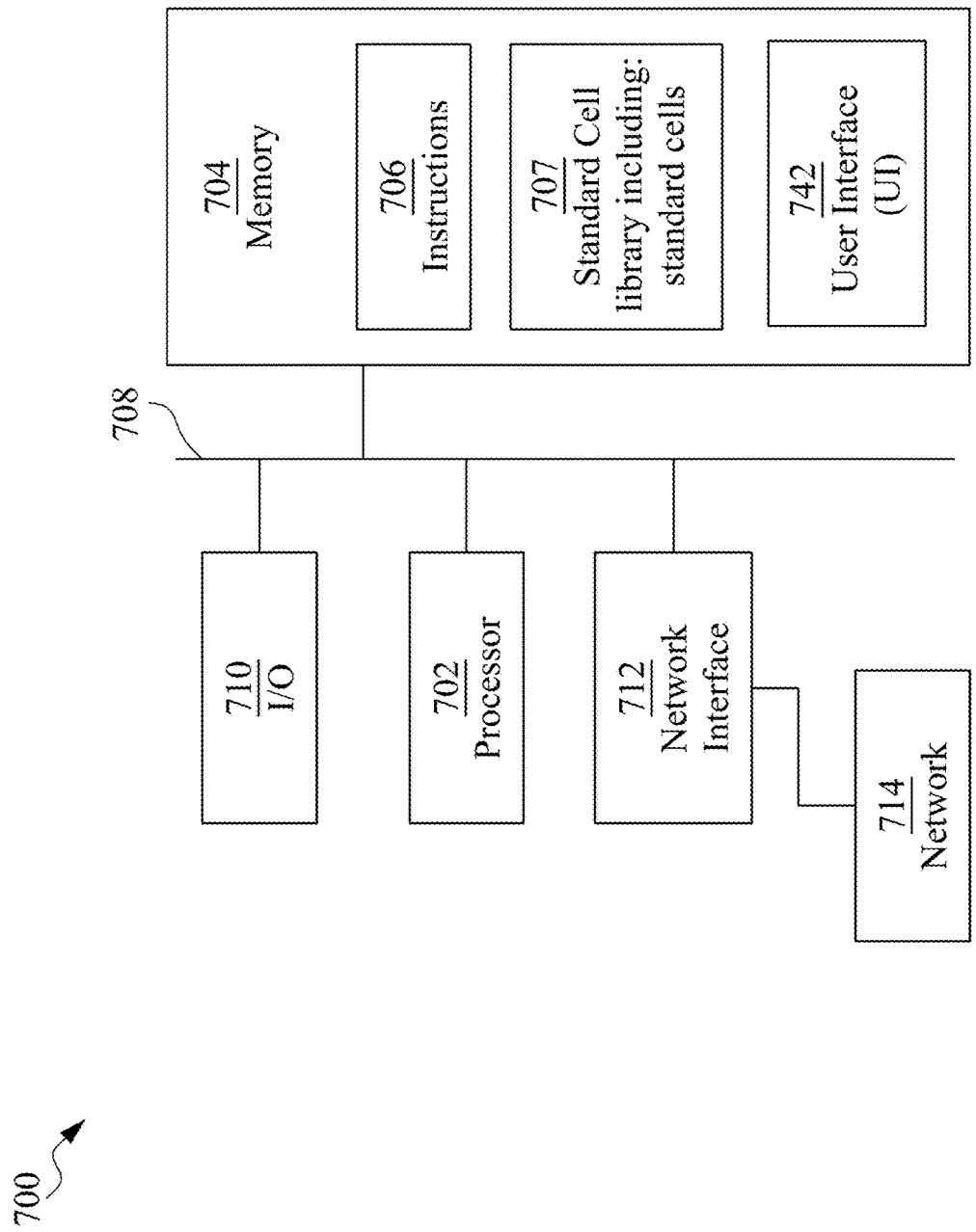
FIG. 7 is a block diagram of an EDA system, in accordance with some embodiments.

FIG. 7 is a block diagram of an electronic design automation (EDA) system 700 in accordance with some embodiments.

In some embodiments, EDA system 700 includes an APR system. Methods described herein of designing layout diagrams represent wire routing arrangements, in accordance with one or more embodiments, are implementable, for example, using EDA system 700, in accordance with some embodiments.

In some embodiments, EDA system 700 is a general purpose computing device including a hardware processor 702 and a non-transitory, computer-readable storage medium 704. Storage medium 704, amongst other things, is encoded with, i.e., stores, computer program code 706, i.e., a set of executable instructions. Execution of instructions 706 by hardware processor 702 represents (at least in part) an EDA tool which implements a portion or all of the methods described herein in accordance with one or more embodiments (hereinafter, the noted processes and/or methods).

Processor 702 is electrically coupled to computer-readable storage medium 704 via a bus 708. Processor 702 is also electrically coupled to an I/O interface 710 by bus 708. A network interface 712 is also electrically connected to processor 702 via bus 708. Network interface 712 is connected to a network 714, so that processor 702 and computer-readable storage medium 704 are capable of connecting to external elements via network 714. Processor 702 is configured to execute computer program code 706 encoded in computer-readable storage medium 704 in order to cause system 700 to be usable for performing a portion or all of the noted processes and/or methods. In one or more embodiments, processor 702 is a central processing unit (CPU), a multi-processor, a distributed processing system, an application specific integrated circuit (ASIC), and/or a suitable processing unit.

In one or more embodiments, computer-readable storage medium 704 is an electronic, magnetic, optical, electromagnetic, infrared, and/or a semiconductor system (or apparatus or device). For example, computer-readable storage medium 704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 704 includes a compact disk-read only memory (CD-ROM), a compact disk-read/write (CD-R/W), and/or a digital video disc (DVD).

In one or more embodiments, storage medium 704 stores computer program code 706 configured to cause system 700 (where such execution represents (at least in part) the EDA tool) to be usable for performing a portion or all of the noted processes and/or methods. In one or more embodiments, storage medium 704 also stores information which facilitates performing a portion or all of the noted processes and/or methods. In one or more embodiments, storage medium 704 stores library 707 of standard cells including such standard cells as disclosed herein.

EDA system 700 includes I/O interface 710. I/O interface 710 is coupled to external circuitry. In one or more embodiments, I/O interface 710 includes a keyboard, keypad, mouse, trackball, trackpad, touchscreen, and/or cursor direction keys for communicating information and commands to processor 702.

EDA system 700 also includes network interface 712 coupled to processor 702. Network interface 712 allows system 700 to communicate with network 714, to which one or more other computer systems are connected. Network interface 712 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 700.

System 700 is configured to receive information through I/O interface 710. The information received through I/O interface 710 includes one or more of instructions, data, design rules, libraries of standard cells, and/or other parameters for processing by processor 702. The information is transferred to processor 702 via bus 708. EDA system 700 is configured to receive information related to a UI through I/O interface 710. The information is stored in computer-readable medium 704 as user interface (UI) 742.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 700. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 8:
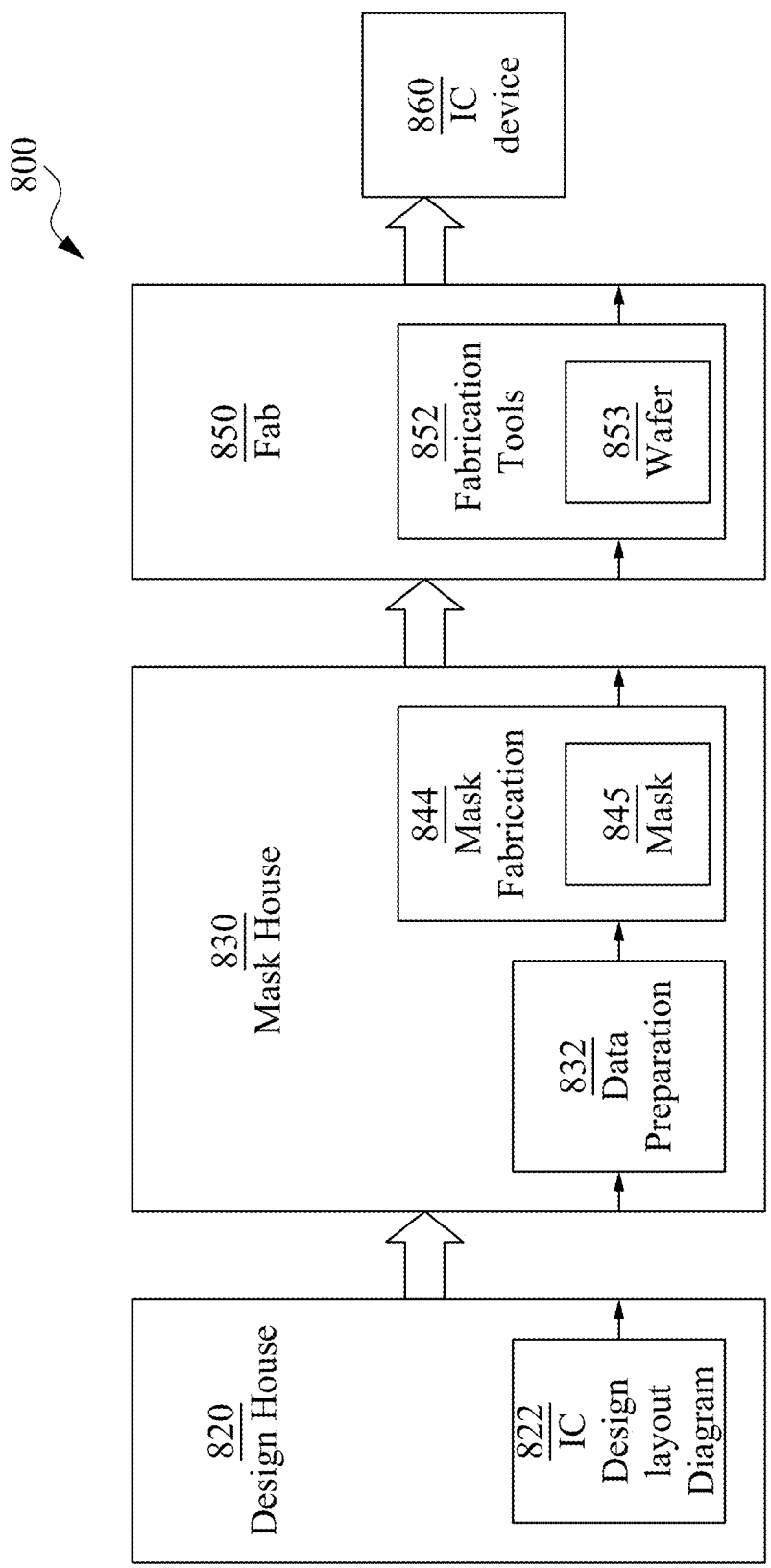
FIG. 8 is a block diagram of an IC manufacturing system and an IC manufacturing flow associated therewith, in accordance with some embodiments.

FIG. 8 is a block diagram of an integrated circuit (IC) manufacturing system 800, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 800.

In FIG. 8, IC manufacturing system 800 includes entities, such as a design house 820, a mask house 830, and an IC manufacturer/fabricator ("fab") 850, that interact with one another in the design, development, and manufacturing cycles and/or services related to manufacturing an IC device 860. The entities in system 800 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 820, mask house 830, and IC fab 850 is owned by a single larger company. In some embodiments, two or more of design house 820, mask house 830, and IC fab 850 coexist in a common facility and use common resources.

Design house (or design team) 820 generates an IC design layout diagram 822. IC design layout diagram 822 includes various geometrical patterns designed for an IC device 860. The geometrical patterns correspond to patterns of metal, oxide, or semiconductor layers that make up the various components of IC device 860 to be fabricated. The various layers combine to form various IC features. For example, a portion of IC design layout diagram 822 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 820 implements a proper design procedure to form IC design layout diagram 822. The design procedure includes one or more of logic design, physical design or place and route. IC design layout diagram 822 is presented in one or more data files having information of the geometrical patterns. For example, IC design layout diagram 822 can be expressed in a GDSII file format or DFII file format.

Mask house 830 includes data preparation 832 and mask fabrication 844. Mask house 830 uses IC design layout diagram 822 to manufacture one or more masks 845 to be used for fabricating the various layers of IC device 860 according to IC design layout diagram 822. Mask house 830 performs mask data preparation 832, where IC design layout diagram 822 is translated into a representative data file ("RDF"). Mask data preparation 832 provides the RDF to mask fabrication 844. Mask fabrication 844 includes a mask writer. A mask writer converts the RDF to an image on a substrate, such as a mask (reticle) 845 or a semiconductor wafer 853. The design layout diagram 822 is manipulated by mask data preparation 832 to comply with particular characteristics of the mask writer and/or requirements of IC fab 850. In FIG. 8, mask data preparation 832 and mask fabrication 844 are illustrated as separate elements. In some embodiments, mask data preparation 832 and mask fabrication 844 can be collectively referred to as mask data preparation.

In some embodiments, mask data preparation 832 includes optical proximity correction (OPC) which uses lithography enhancement techniques to compensate for image errors, such as those that can arise from diffraction, interference, other process effects and the like. OPC adjusts IC design layout diagram 822. In some embodiments, mask data preparation 832 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 832 includes a mask rule checker (MRC) that checks the IC design layout diagram 822 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 822 to compensate for limitations during mask fabrication 844, which may undo part of the modifications performed by OPC in order to meet mask creation rules.

In some embodiments, mask data preparation 832 includes lithography process checking (LPC) that simulates processing that will be implemented by IC fab 850 to fabricate IC device 860. LPC simulates this processing based on IC design layout diagram 822 to create a simulated manufactured device, such as IC device 860. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 822.

It should be understood that the above description of mask data preparation 832 has been simplified for the purposes of clarity. In some embodiments, data preparation 832 includes additional features such as a logic operation (LOP) to modify the IC design layout diagram 822 according to manufacturing rules. Additionally, the processes applied to IC design layout diagram 822 during data preparation 832 may be executed in a variety of different orders.

After mask data preparation 832 and during mask fabrication 844, a mask 845 or a group of masks 845 are fabricated based on the modified IC design layout diagram 822. In some embodiments, mask fabrication 844 includes performing one or more lithographic exposures based on IC design layout diagram 822. In some embodiments, an electron-beam (e-beam) or a mechanism of multiple e-beams is used to form a pattern on a mask (photomask or reticle) 845 based on the modified IC design layout diagram 822. Mask 845 can be formed in various technologies. In some embodiments, mask 845 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 845 includes a transparent substrate (e.g., fused quartz) and an opaque material (e.g., chromium) coated in the opaque regions of the binary mask. In another example, mask 845 is formed using a phase shift technology. In a phase shift mask (PSM) version of mask 845, various features in the pattern formed on the phase shift mask are configured to have proper phase difference to enhance the resolution and imaging quality. In various examples, the phase shift mask can be attenuated PSM or alternating PSM. The mask(s) generated by mask fabrication 844 is used in a variety of processes. For example, such a mask(s) is used in an ion implantation process to form various doped regions in semiconductor wafer 853, in an etching process to form various etching regions in semiconductor wafer 853, and/or in other suitable processes.

IC fab 850 is an IC fabrication business that includes one or more manufacturing facilities for the fabrication of a variety of different IC products. In some embodiments, IC Fab 850 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 850 includes fabrication tools 852 configured to execute various manufacturing operations on semiconductor wafer 853 such that IC device 860 is fabricated in accordance with the mask(s), e.g., mask 845. In various embodiments, fabrication tools 852 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 850 uses mask(s) 845 fabricated by mask house 830 to fabricate IC device 860. Thus, IC fab 850 at least indirectly uses IC design layout diagram 822 to fabricate IC device 860. In some embodiments, semiconductor wafer 853 is fabricated by IC fab 850 using mask(s) 845 to form IC device 860. In some embodiments, the IC fabrication includes performing one or more lithographic exposures based at least indirectly on IC design layout diagram 822. Semiconductor wafer 853 includes a silicon substrate or other proper substrate having material layers formed thereon. Semiconductor wafer 853 further includes one or more of various doped regions, dielectric features, multilevel interconnects, and the like (formed at subsequent manufacturing steps).

Details regarding an integrated circuit (IC) manufacturing system (e.g., system 800 of FIG. 8), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In some embodiments, an integrated circuit (IC) device comprises a plurality of TAP cells arranged at intervals in a first direction and a second direction transverse to the first direction. The plurality of TAP cells comprises at least one first TAP cell. The first TAP cell comprises two first end areas and a first middle area arranged consecutively in the second direction. The first middle area comprises a first dopant of a first type implanted in a first well region of the first type. The first end areas are arranged on opposite sides of the first middle area in the second direction. Each of the first end areas comprises a second dopant of a second type implanted in the first well region, the second type different from the first type.

In some embodiments, a method comprises forming, over a substrate, a plurality of first TAP cells of a first type in a plurality of first columns and a plurality of first rows, and forming, over the substrate, a plurality of second TAP cells of a second type in a plurality of second columns and a plurality of second rows. The second type is different from the first type. The plurality of first rows and the plurality of second rows extend in a first direction. The plurality of first columns and the plurality of second columns are alternatingly arranged and spaced from each other in the first direction, and extend in a second direction transverse to the first direction. The first TAP cells in each first row among the plurality of first rows partially overlap, in the first direction, the second TAP cells in a corresponding second row among the plurality of second rows.

In some embodiments, a system comprises a processor configured to perform TAP cell placement in an integrated circuit (IC) layout diagram by placing a plurality of first well regions of a first type and a plurality of second well regions of a second type different from the first type, placing a plurality of first connection well regions of the first type, and placing a plurality of first TAP cells. The plurality of first well regions and the plurality of second well regions extend in a first direction and are arranged alternatingly in a second direction transverse to the first direction. Each first connection well region among the plurality of first connection well regions extends, in the second direction, between a pair of adjacent first well regions among the plurality of first well regions and across a second well region among the plurality of second well regions. Each first TAP cell among the plurality of first TAP cells is placed corresponding to a first connection well region among the plurality of first connection well regions.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit (IC) device, comprising:
   a plurality of TAP cells arranged at intervals in a first direction and a second direction transverse to the first direction,
   the plurality of TAP cells comprising at least one first TAP cell, and
   the first TAP cell comprising two first end areas and a first middle area,
      the first middle area comprising a first dopant of a first type implanted in a first well region of the first type, and
      the first end areas continuous to the first middle area and arranged on opposite sides of the first middle area in the second direction, each of the first end areas comprising a second dopant of a second type implanted in the first well region, the second type different from the first type, wherein
   the plurality of TAP cells further comprises at least one second TAP cell,
   the second TAP cell comprising two second end areas and a second middle area,
      the second middle area comprising the second dopant implanted in a second well region of the second type, and
      the second end areas continuous to the second middle area and arranged on opposite sides of the second middle area in the second direction, each of the second end areas comprising the first dopant implanted in the second well region,
   the first middle area of the first tap cell is electrically coupled to a first node of a first power supply voltage, and
   the second middle area of the second tap cell is electrically coupled to a second node of a second power supply voltage different from the first power supply voltage.

2. The IC device of claim 1, comprising at least one of
   a height of the first middle area in the second direction being a half of a height of the first TAP cell in the second direction, or
   a height of the second middle area in the second direction being a half of a height of the second TAP cell in the second direction.

3. The IC device of claim 2, wherein
   the height of at least one of the first TAP cell or the second TAP cell in the second direction is twice a device cell height.

4. The IC device of claim 3, wherein
   the device cell height is from 0.025 µm to 0.300 µm, and
   the height of at least one of the first TAP cell or the second TAP cell in the second direction is from 0.05 µm to 0.600 µm.

5. The IC device of claim 1, wherein
   one of the first end areas of the first TAP cell overlaps the second middle area of the second TAP cell in the first direction, and
   one of the second end areas of the second TAP cell overlaps the first middle area of the first TAP cell in the first direction.

6. The IC device of claim 5, wherein
   the other of the first end areas of the first TAP cell does not overlap the second middle area of the second TAP cell in the first direction, and
   the other of the second end areas of the second TAP cell does not overlap the first middle area of the first TAP cell in the first direction.

7. The IC device of claim 1, wherein
   the at least one first TAP cell comprises a plurality of first TAP cells arranged in a plurality of first columns extending in the second direction,
   the at least one second TAP cell comprises a plurality of second TAP cells arranged in a plurality of second columns extending in the second direction, and
   the plurality of first columns and the plurality of second columns are alternatingly arranged in the first direction.

8. The IC device of claim 7, wherein
   a first maximum device-to-TAP distance in the first direction from a first TAP cell among the plurality of first TAP cells to an adjacent second TAP cell among the plurality of second TAP cells, or from a second TAP cell among the plurality of second TAP cells to an adjacent first TAP cell among the plurality of first TAP cells, is from 1 µm to 300 µm, and
   a second maximum device-to-TAP distance in the second direction from the first middle area of a first TAP cell among the plurality of first TAP cells to an adjacent well region of the second type, or from the second middle area of a second TAP cell among the plurality of second TAP cells to an adjacent well region of the first type, is from 0.025 µm to 0.300 µm.

9. The IC device of claim 7, wherein
   each of the plurality of first TAP cells is arranged, in the first direction, between two adjacent second TAP cells among the plurality of second TAP cells, and the first well region of said each first TAP cell extends, in the second direction, continuously into a well region of the first type between the two adjacent second TAP cells, and each of the plurality of second TAP cells is arranged, in the first direction, between two adjacent first TAP cells among the plurality of first TAP cells, and the second well region of said each second TAP cell extends, in the second direction, continuously into a well region of the second type between the two adjacent first TAP cells.

10. The IC device of claim 9, wherein
the well region of the second type between the two adjacent first TAP cells comprises first transistors of the first type, and said each second TAP cell is configured to collect a body current of the first transistors in the well region of the second type between the two adjacent first TAP cells, and
the well region of the first type between the two adjacent second TAP cells comprises second transistors of the second type, and said each first TAP cell is configured to collect a body current of the second transistors in the well region of the first type between the two adjacent second TAP cells.

11. The IC device of claim 1, wherein
the first type is N-type and the second type is P-type.

12. An integrated circuit (IC) device, comprising:
a substrate;
over the substrate, a plurality of first TAP cells over corresponding well regions of a first type in a plurality of first columns and a plurality of first rows; and
over the substrate, a plurality of second TAP cells over corresponding well regions of a second type in a plurality of second columns and a plurality of second rows, the second type different from the first type,
wherein
the plurality of first rows and the plurality of second rows extend in a first direction,
the plurality of first columns and the plurality of second columns are alternatingly arranged and spaced from each other in the first direction, and extend in a second direction transverse to the first direction, and
the first TAP cells and the corresponding well regions of the first type in each first row among the plurality of first rows partially overlap, in the first direction, the second TAP cells and the corresponding well regions of the second type in a corresponding second row among the plurality of second rows.

13. The IC device of claim 12, further comprising, over the substrate:
a plurality of first well regions of the first type and a plurality of second well regions of the second type,
wherein
the plurality of first well regions and the plurality of second well regions extend in the first direction and are arranged alternatingly in the second direction,
each first TAP cell among the plurality of first TAP cells extends, in the second direction, from one first well region among the plurality of first well regions to an adjacent first well region among the plurality of first well regions across a second well region among the plurality of second well regions, and
each second TAP cell among the plurality of second TAP cells extends, in the second direction, from one second well region among the plurality of second well regions to an adjacent second well region among the plurality of second well regions across a first well region among the plurality of first well regions.

14. The IC device of claim 12, further comprising, over the substrate:
a plurality of first well regions of the first type and a plurality of second well regions of the second type; and
a plurality of first connection well regions of the first type and a plurality of second connection well regions of the second type,
wherein
the plurality of first well regions and the plurality of second well regions extend in the first direction and are arranged alternatingly in the second direction,
each first connection well region among the plurality of first connection well regions extends, in the second direction, between a pair of adjacent first well regions among the plurality of first well regions and across a second well region among the plurality of second well regions, and said each first connection well region is continuous to the pair of adjacent first well regions, and
each second connection well region among the plurality of second connection well regions extends, in the second direction, between a pair of adjacent second well regions among the plurality of second well regions and across a first well region among the plurality of first well regions, and said each second connection well region is continuous to the pair of adjacent second well regions.

15. The IC device of claim 14, wherein
for each first TAP cell among the plurality of first TAP cells, the corresponding well region of the first type comprises a first connection well region among the plurality of first connection well regions, and
for each second TAP cell among the plurality of second TAP cells, the corresponding well region of the second type comprises a second connection well region among the plurality of second connection well regions.

16. The IC device of claim 15, wherein
said each first TAP cell comprises two first end areas and a first middle area,
the first end areas are arranged on opposite sides of the first middle area in the second direction, and are correspondingly over the adjacent first well regions between which the first connection well region corresponding to said each first TAP cell extends, and
the first middle area is over the first connection well region corresponding to said each first TAP cell, and
said each second TAP cell comprises two second end areas and a second middle area,
the second end areas are arranged on opposite sides of the second middle area in the second direction, and are correspondingly over the adjacent second well regions between which the second connection well region corresponding to said each second TAP cell extends, and
the second middle area is over the second connection well region corresponding to said each second TAP cell.

17. The IC device of claim 16, wherein
one of the first end areas of a first TAP cell among the plurality of first TAP cells overlaps, in the first direction, the second middle area of a second TAP cell among the plurality of second TAP cells, and
one of the second end areas of the second TAP cell overlaps, in the first direction, the first middle area of the first TAP cell.

18. The IC device of claim 17, wherein
the other of the first end areas of the first TAP cell does not overlap the second middle area of the second TAP cell in the first direction, and
the other of the second end areas of the second TAP cell does not overlap the first middle area of the first TAP cell in the first direction.

19. An integrated circuit (IC) device, comprising:
a plurality of first well regions of a first type and a plurality of second well regions of a second type different from the first type, wherein the plurality of first well regions and the plurality of second well regions extend in a first direction and are arranged alternatingly in a second direction transverse to the first direction;
a plurality of first connection well regions of the first type, wherein
each first connection well region among the plurality of first connection well regions extends, in the second direction, between a pair of adjacent first well regions among the plurality of first well regions and across a second well region among the plurality of second well regions, and
said each first connection well region is continuous to the pair of adjacent first well regions; and
a plurality of first TAP cells, wherein each first TAP cell among the plurality of first TAP cells corresponds to a first connection well region among the plurality of first connection well regions.

20. The IC device of claim 19, further comprising:
a plurality of second connection well regions of the second type, wherein
each second connection well region among the plurality of second connection well regions extends, in the second direction, between a pair of adjacent second well regions among the plurality of second well regions and across a first well region among the plurality of first well regions, and
said each second connection well region is continuous to the pair of adjacent second well regions; and
a plurality of second TAP cells, wherein each second TAP cell among the plurality of second TAP cells corresponds to a second connection well region among the plurality of second connection well regions.

\* \* \* \* \*